US009346388B2

(12) United States Patent
Aamodt et al.

(10) Patent No.: US 9,346,388 B2
(45) Date of Patent: May 24, 2016

(54) ADAPTABLE BOAT TRAILER AND METHOD OF USE

(71) Applicant: Products 21st LLC, Wayzata, MN (US)

(72) Inventors: James H. Aamodt, Wayzata, MN (US); Todd S. Langenbach, Zimmerman, MN (US)

(73) Assignee: PRODUCTS 21ST LLC, Wayzata, MN (US)

( * ) Notice: Subject to any disclaimer, the term of this patent is extended or adjusted under 35 U.S.C. 154(b) by 0 days.

(21) Appl. No.: 14/448,788

(22) Filed: Jul. 31, 2014

(65) Prior Publication Data

US 2016/0031352 A1 Feb. 4, 2016

(51) Int. Cl.
*B60P 3/10* (2006.01)
*B60P 1/02* (2006.01)

(52) U.S. Cl.
CPC .............. *B60P 1/027* (2013.01); *B60P 3/1041* (2013.01)

(58) Field of Classification Search
CPC ............................... B60P 1/027; B60P 3/1041
USPC ....................................................... 280/414.1
See application file for complete search history.

(56) References Cited

U.S. PATENT DOCUMENTS

| 4,077,643 | A | * | 3/1978 | Bates | B62D 53/062 |
|---|---|---|---|---|---|
| | | | | | 280/414.1 |
| 5,481,999 | A | * | 1/1996 | Clark | B62D 35/001 |
| | | | | | 114/361 |
| 6,592,139 | B1 | * | 7/2003 | Shanahan | B60P 1/027 |
| | | | | | 280/414.5 |
| 7,347,436 | B1 | * | 3/2008 | Fawcett | B60G 3/01 |
| | | | | | 280/124.127 |
| 7,828,316 | B1 | * | 11/2010 | Joseph | B60J 7/062 |
| | | | | | 280/414.1 |
| 8,246,066 | B1 | * | 8/2012 | Allen | B60P 3/10 |
| | | | | | 280/414.1 |
| 9,050,920 | B2 | * | 6/2015 | Aubrey | B60P 1/027 |

OTHER PUBLICATIONS

Brochure entitled "Brownell Trailers™, Engineered for the Long Haul", ©2012, 9 pages.
Brochure entitled "Draw-Tite®, Quality Meets Experience", Draw-Tite® Hide-A-Goose™ Gooseneck Hitch, ©2013 Cequent Performance Products, Inc. 20 pages.
Brochure entitled "Highway Trailers" from Kropf Industrial Inc, created Jul. 2012, 3 pages. http://www.kropfindustrial.com/docs/conolift-marine-hydraulic-trailer-brochures/kropfconolift_highway_e.pdf.

(Continued)

*Primary Examiner* — Joseph Rocca
*Assistant Examiner* — Marlon Arce
(74) *Attorney, Agent, or Firm* — Faegre Baker Daniels LLP

(57) ABSTRACT

Apparatus and methods relating to an adaptable boat trailer for safely and gently storing, transporting, launching, and recovering a boat. The boat may be a wooden pleasure boat from 18 to 34 feet in length. The adaptable boat trailer comprises a trailer frame, a cover assembly, a rear suspension assembly having wheels, and a front suspension assembly. The cover assembly may include a fixed cabin and a retractable tarp assembly rearward of the fixed cabin. The front suspension assembly is configured for independently raising and lowering the front end of the adaptable boat trailer to clear a hump on a ramp, for example. The rear suspension assembly is configured for raising and lowering the rear end of the trailer frame to launch or recover the boat and escape a washout. A rescue flange may be included forward of the wheels to assist in rescue.

13 Claims, 13 Drawing Sheets

(56) References Cited

OTHER PUBLICATIONS

Brochure entitled "Ice House Frames, Shells, Supplies, Finished Fish Houses", Innovative Recreation LLC, saved Oct. 7, 2013 from https://web.archive.org/web/20131007203410/http://innovativerecreation.com/FRAMES_SKELETONS.html, 2 pages.

Brochure from Quick Draw Tarpaulin Systems™, www.QuickDrawTarps.com, Copyright 2010, 2 pages.

Brochure of Trailers, Innovative Recreation LLC, downloaded from http://www.innovativerecreation.com/FEATURES.html on Feb. 2, 2012, 1 page.

Dexter Axle Product Catalogue entitled "600-8,000 Lbs. Capacity", 2014, pp. 84-85 downloaded from http://dexteraxle.com/i/u/6149609/f/600-8K_Catalog/600-8K_Complete_Catalog.pdf.

Operator's Manual, Quick Draw Tarpaulin Systems™, copyright Quick Draw Tarp Systems Windsor, Ltd. 2010-2012, 40 pages.

YH-812 Marine Hydraulic Highway Trailer, Standard Capacities and Features, Effective Date Nov. 1, 2013, 1 page.

* cited by examiner

ADAPTABLE BOAT TRAILER AND METHOD OF USE

TECHNICAL FIELD

The disclosure relates to boat trailers generally. In particular, the disclosure relates to adaptable boat trailers for storing, transporting, launching, and recovering pleasure boats.

BACKGROUND

Boat trailers are often adapted for storing, transporting, launching, and recovering boats. Some boats, which are antiques or classic boats, have considerable value. At the same time, these boats, such as wooden pleasure boats, may be very vulnerable to severe weather, dirt, debris, and vandalism during storage and transportation. Furthermore, due to the size of these boats, sometimes 18 to 34 feet in length, sizeable humps and washouts near the ends of some ramps make launch and recovery difficult. As such, there remains a need for improved methods for gently and safely storing, transporting, launching, and recovering classic wooden pleasure boats.

SUMMARY

Various embodiments of the disclosure relate to an adaptable boat trailer, comprising a trailer frame including a front end, a rear end, and a body between the front end and the rear end. The adaptable boat trailer also includes a plurality of support bunks on the body configured to support a boat. The rear end is adapted for ease of launch and recovery of the boat, and may include a propeller shield. The adaptable boat trailer further includes a cover assembly attached to the trailer frame for selectively covering the boat. In some embodiments, the cover assembly further includes a fixed cabin and a retractable tarp system.

The adaptable boat trailer includes a front suspension assembly attached to the trailer frame front end and configured for independently raising and lowering the front end of the adaptable boat trailer. In various embodiments, the front suspension assembly includes a coupler for removably securing the adaptable boat trailer to a hitch or mount on the vehicle, at least one hydraulic cylinder adapted to contract and extend, and a suspension arm attached to the coupler and the at least one hydraulic cylinder adapted to move in response to the contracting and extending of the at least one hydraulic cylinder.

The adaptable boat trailer also includes a rear suspension assembly attached to the trailer frame and configured for raising and lowering the rear end of the trailer frame by extending or contracting the hydraulic cylinders. In some embodiments, the rear suspension assembly includes a rear suspension frame attached to the trailer frame, a plurality of torsion axles rotatably attached to the rear suspension frame, a pair of wheels attached to each of the plurality of torsion axles to enable the adaptable boat trailer to move over a surface, a pair of lever arms extending perpendicularly from each torsion axle, a pair of beams extending longitudinally in parallel each rotatably attached to two lever arms such that the torsion axles rotate together, and a pair of rear hydraulic cylinders each secured on a first end to one of the lever arms of a torsion axle and secured on a second end to the rear suspension frame such that the torsion axles rotate in response to contracting and extending the rear hydraulic cylinders.

Various embodiments of the disclosure relate to methods of launching or recovering a boat with a boat trailer. In some embodiments, a method for operating a boat trailer having retractable wheels to launch a pleasure boat into a body of water comprises: retracting a retractable tarp system to uncover a rear section of the boat trailer; backing the boat trailer onto a ramp, the ramp including a first section with a first grade, a second section extending toward the body of water having a second grade steeper than the first grade, and a transition between the first section and the second section; raising a front end of the boat trailer above a road clearance height to prevent a portion of the boat trailer from contacting the transition; backing a rear end of the boat trailer into the body of water; retracting the wheels to lower a rear end of the boat trailer; and releasing the pleasure boat from the boat trailer.

In various embodiments, a method for operating a boat trailer having retractable wheels to recover a pleasure boat from a body of water comprises: backing the boat trailer down a ramp and into the body of water; backing a rear end of the boat trailer into the body of water; receiving the boat onto the boat trailer; retracting the wheels such that the center point of each wheel is above a rescue height; pulling the rear end of the boat trailer from the body of water; and extending a retractable tarp system to cover a rear section of the boat trailer.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
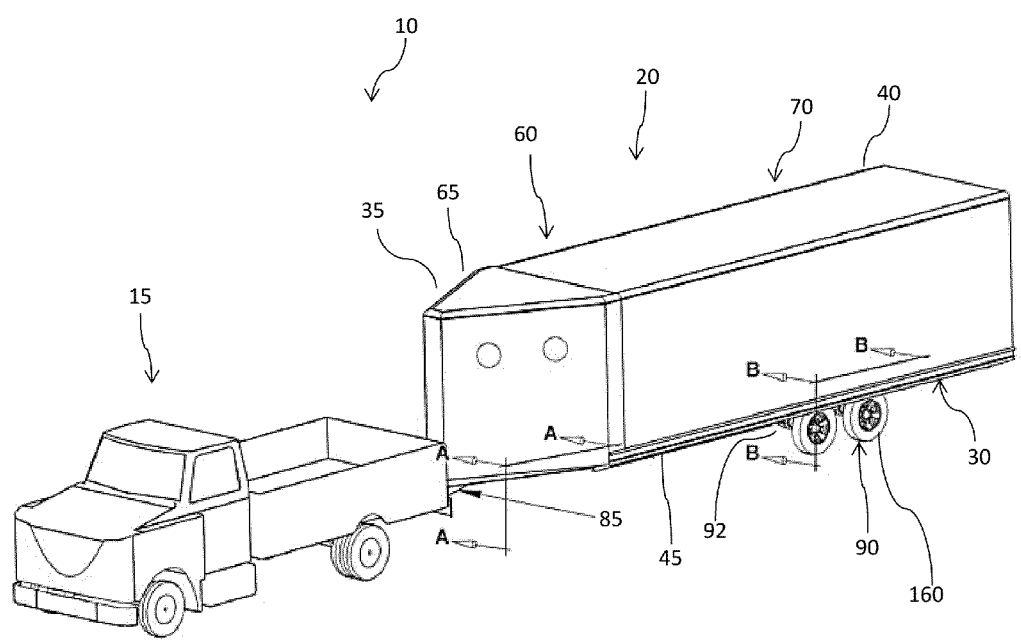
FIG. 1 is a perspective view of the boat transportation system including an adaptable boat trailer, according to some embodiments of the disclosure. Cross-sections A-A-A and B-B-B are also shown.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Figure 2:
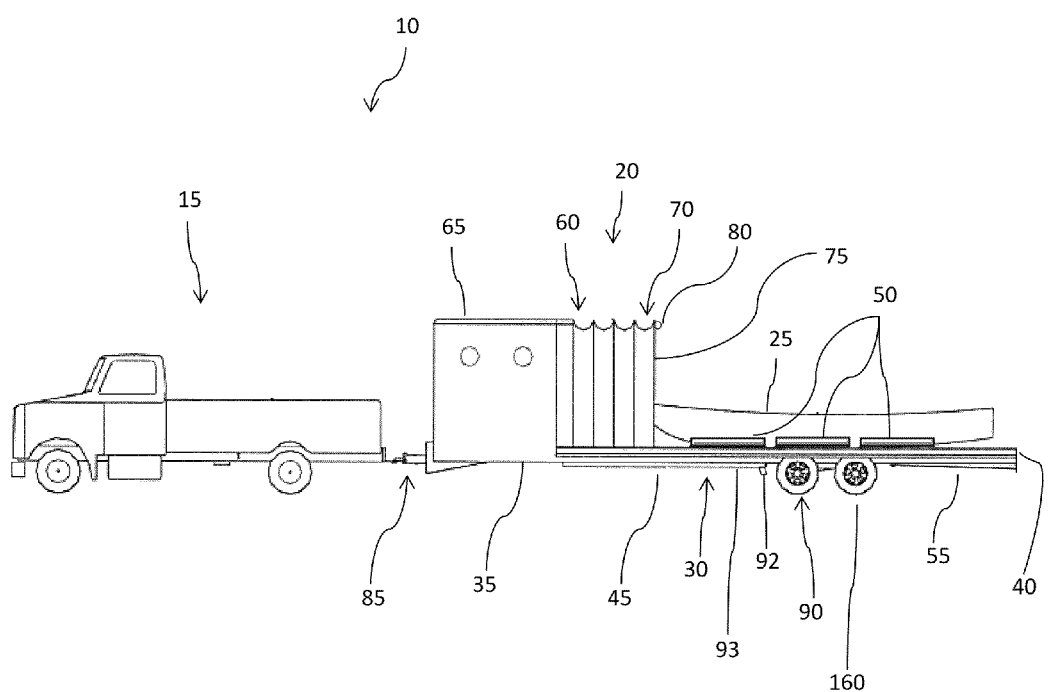
FIG. 2 is an elevated side view of the boat transportation system of FIG. 1.
Figure 3:
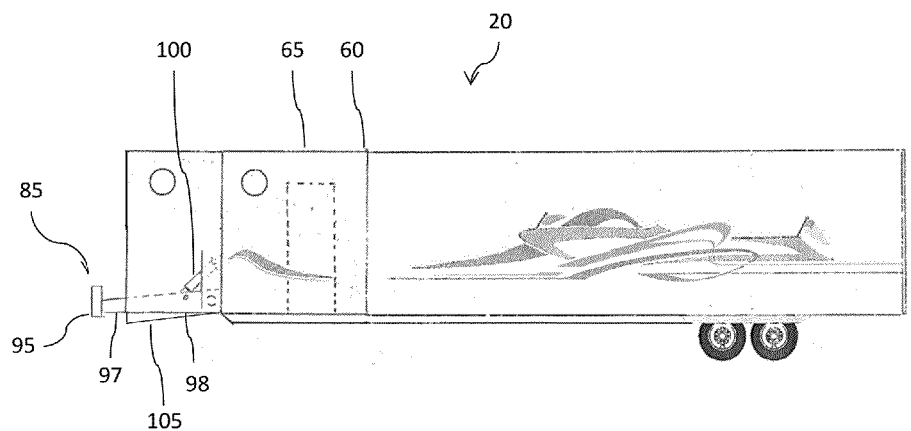
FIG. 3 is an elevated side view of an adaptable boat trailer having a front suspension assembly including a coupler, according to some embodiments of the disclosure.

FIGS. 1 and 2 are views of a boat transportation system 10, according to some embodiments of the disclosure. FIG. 1 is a perspective view of the boat transportation system 10 including an adaptable boat trailer 20. FIG. 2 is an elevated side view. Boat transportation system 10 includes a vehicle 15 removably coupled to an adaptable boat trailer 20. The vehicle 15 can be a light duty truck, as shown, or any vehicle suited to tow the adaptable boat trailer 20 from one place to another.

The adaptable boat trailer 20 extends longitudinally rearward from the vehicle 15 and is configured to carry, or support, a boat 25 during storage or transportation on a road or other surface. The adaptable boat trailer 20 is also configured to bring the boat 25 to a body of water for launch and recovery of the boat from the body of water. Various features of the adaptable boat trailer 20 enable transporting the boat 25 safely on a road up to highway speeds, avoiding damage to the adaptable boat trailer and boat during launch and recovery, and launching the boat at a low angle. A low-angle launch is advantageous in various situations, such as shallow water, insufficient ramp length, or when low impact is desired to protect the boat or the environment.

In some embodiments, the boat 25 is a pleasure boat. Further embodiments include a boat 25 with a wooden hull, which may be particularly sensitive to vibration and damage during storage, transport, launch, or recovery. The boat 25 can vary in length, for example, from 18 to 34 feet.

As shown, adaptable boat trailer 20 includes a trailer frame 30 including a front end 35, a rear end 40, and a body 45 extending between the ends. In some embodiments, the trailer frame 30 including its components are substantially planar but is angled on the interior to help receive the hull of the boat 25 as can be determined by a person having ordinary skill in the art. Also, the rear end 40 may include a propeller shield 55. As shown, the propeller shield 55 extends below the trailer frame 30 to provide a recessed protection area for the propeller of the boat 25. The propeller shield 55, in some embodiments, extends about 15 inches below the trailer frame 30.

In the illustrated embodiment, the front end 35 is shaped in a "V" with the point extending toward the vehicle 15. In various embodiments, the adaptable boat trailer 20 completely or fully encapsulates the boat 25 for protection from the environment (e.g. precipitation, wind, hail, exterior and underside debris, animals, and vandalism) including the underside. In some embodiments, the outer width of the adaptable boat trailer 20 is about 108 inches. In some further embodiments, the inside cover width of the adaptable boat trailer 20 is about 102 inches.

To further support the boat 25 on the body 45, the body includes a plurality of support bunks 50 on the body configured to support and nest the boat to prevent lateral movement of the boat with respect to the trailer frame in the illustrated embodiment. The number and size of the support bunks 50 is responsive to the size and shape of the boat 25. The support bunks 50 extend above the body 45 and angle inward to flatly engage the hull of boat 25.

The adaptable boat trailer 20 includes a cover assembly 60 attached to the trailer frame extending from the front end 35 to the rear end 40, according to some embodiments. The cover assembly 60 may be permanently or removably attached. The cover assembly 60 extends above the trailer frame 30 and is adapted to cover the boat 25 for protection from the environment, such as hail when being stored or debris when being transported on the highway. The cover assembly 60 may include one or multiple sections. As shown, cover assembly 60 includes two sections, a fixed cabin 65 and a retractable tarp system 70 attached to the fixed cabin and positioned rearward of the fixed cabin. The fixed cabin 65 covers the front end 35, and the retractable tarp system 70 covers the rear end 40. Portions of the body 45 are also covered by either the fixed cabin 65 or the retractable tarp system 70.

The retractable tarp system 70 is adapted to cover the boat in one position and uncover at least a rear section of the boat in another position. As shown, the retractable tarp system 70 includes a slidable cover 75 and a rear flap 80 attached to the slidable cover at a rear end. The slidable cover 75 is configured for retracting into an accordion-like shape to uncover the rear end 40 and configured for extending to cover the rear end 40. The rear flap 80 is adapted to release from the slidable cover 75 to allow the cover to retract and uncover the boat 25. In the illustrated embodiment, for example, the rear flap 80 may release on three sides while remaining attached at the top to the slidable cover 75 and be further configured to roll up, scrunch, or otherwise retract to allow space for the boat 25 as the slidable cover retracts. One example of a suitable retractable tarp system 70 is similar to that shown in U.S. Pat. No. 7,344,178, titled "Vehicle Covering Structure."

The adaptable boat trailer 20 includes a front suspension assembly 85 attached to the trailer frame front end 35 and a rear suspension assembly 90 attached to the trailer frame 30 rearwardly of the front suspension assembly. The front suspension assembly 85 is adapted to couple, or tether, the adaptable boat trailer 20 to the vehicle 15. In various embodiments of the disclosure, the front suspension assembly 85 is configured for independently raising and lowering the front end 35. The rear suspension assembly 90 is attached to the trailer frame body 45 and/or the rear end 40 in some embodiments and is adapted for supporting the trailer frame 30 over a surface, such as a road. Independent of the front suspension assembly 85, the rear suspension assembly 90 is configured for raising and lowering the rear end 40 in various embodiments.

In the illustrated embodiment, the adaptable boat trailer 20 includes a rescue flange 92 on the body 45 of the trailer frame 30 forward of the rear suspension assembly 90. The rescue flange 92 functions as a recovery assist for the wheels 160 when caught in a washout (described in more detail herein). The rescue flange 92 extends at an angle downward and backward from the trailer frame 30 and is adapted for supporting and lifting the rear end 40 as the trailer frame 30 is pulled forward. In some embodiments, the rescue flange 92 is attached to, or extends from, a skid rail 93 attached to the bottom of the trailer frame 30. The rescue flange 92 may extend at a 45 degree angle from the skid rail 93, for example. The skid rail 93 is adapted to slide and to engage a ramp or other surface to prevent the trailer frame 30 and boat 25 from damage. For example, the skid rail 93 is adapted to bear the weight of the rear end 40 when the wheels 160 are retracted. In some embodiments, the adaptable boat trailer 20 further includes (not shown) a wireless one-man tarp control, a video assist, and a versatile support bunk configuration for adjustment with one tool.

Figures 4A, 4B, 4C:
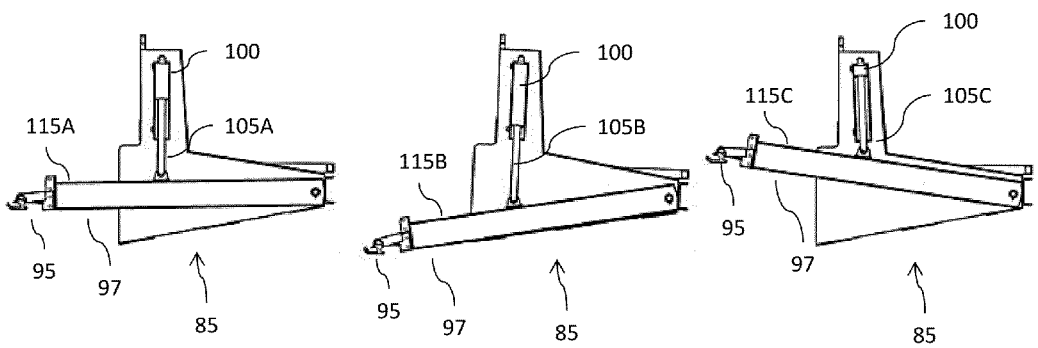
FIGS. 4A-C are elevated side views along cross-section A-A-A shown in FIG. 1 of the front suspension assembly with a hydraulic cylinder in various positions, according to some embodiments of the disclosure.

Referring now to FIGS. 3 and 4A-C, FIG. 3 is an elevated side view of adaptable boat trailer 20 of the front suspension assembly 85 including a coupler 95, according to some embodiments of the disclosure. FIGS. 4A-C are elevated side views of front suspension assembly 85 along cross-section A-A-A (as shown in FIG. 1) with the hydraulic cylinder 100 in various positions 105A-C, according to some embodiments of the disclosure.

As shown, the front suspension assembly 85 is attached to the front end 35 of the trailer frame 30. The front suspension assembly 85 includes a suspension arm 97 attached at a pivot point 98 on one end, a coupler 95 attached to the other end of the suspension arm to removably secure the adaptable boat trailer 20 to the vehicle 15 (as shown elsewhere herein), and a hydraulic cylinder 100. In some embodiments, the coupler 95 is a ball trailer hitch coupler adapted to mechanically couple to a trailer ball hitch (not shown) extending rearwardly from vehicle 15. A portion of the cover assembly 60, such as the fixed cabin 65, is positioned over and around the front suspension assembly 85 for protection from the environment. In other embodiments, the coupler 95 is a pintle-type coupler or a gooseneck-type coupler.

The front suspension assembly 85 raises and lowers the front end 35 of the trailer frame 30 in response to extending or contracting, respectively, the hydraulic cylinder 100. Throughout the disclosure, hydraulic cylinders are referred to that may be controlled hydraulically, electrically, and/or electronically by direct wire or wireless controls for convenience. The front suspension assembly 85 may include a housing 105 surrounding the suspension arm 97 and giving room for the suspension arm to pivot. In some embodiments, the housing 105 is included in the cover assembly 60.

In the illustrated embodiment, intermediate position 105A corresponds to a position 115A (e.g. road clearance position) of the front end 35, which may further correspond to a road clearance height. Extended position 105B corresponds to a raised position 115B (e.g. ramp clearance position) of the front end 35 above the road clearance position 115A. Contracted position 110C corresponds to a lowered position 115C of the front end 35 below the road clearance height. In some embodiments, the road clearance height is about 14 inches above a road surface, or about 12 inches when loaded. In various embodiments, the raised position 115B is about 19 inches above a road clearance position 115A for a total of about 31 to 33 inches above a road surface, for example. In further embodiments, the lowered position 115C is about 8 inches below the road clearance position 115A for a total of about 6 inches above a road surface, for example.

Figure 5:
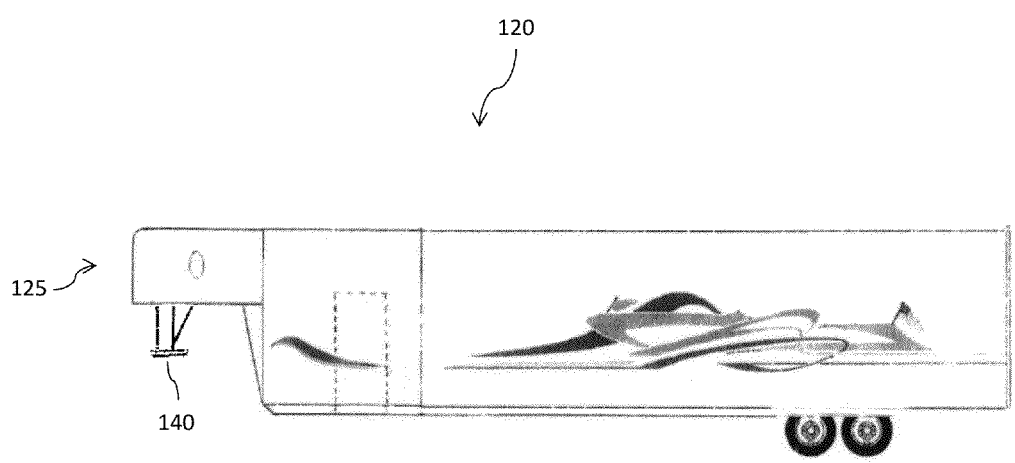
FIG. 5 is an elevated side view of an adaptable boat trailer having a front suspension assembly including a gooseneck-type coupler, according to some alternative embodiments.

FIG. 5 is an elevated side view of an adaptable boat trailer 120 having a front suspension assembly 125 including a gooseneck-type coupler 140, according to alternative embodiments. Adaptable boat trailer 120 is similar to adaptable boat trailer 20, except that adaptable boat trailer 120 includes a gooseneck-type front suspension assembly 125 instead of front suspension assembly 85 (as shown elsewhere herein). The front suspension assembly 125 includes similar components to front suspension assembly 85, such as a suspension arm (not shown) attached at a pivot point (not shown) on one end, a coupler 140 attached to the other end of the suspension arm to removably secure the adaptable boat trailer 120 to a gooseneck mount (not shown) on the vehicle 15, and one or more hydraulic cylinders (not shown). The gooseneck mount may be a ball-type mount or a fifth-wheel-type mount, for example. As known to those having skill in the art, the gooseneck mount is often positioned in a flatbed of a truck or as part of the body of a truck. As such, the front suspension assembly 125 is positioned higher than front suspension assembly 85 to attach the coupler 140 to the gooseneck mount from above. An exemplary gooseneck mount suitable for use in some embodiments is a Goose Box available from Reese. Both types of front suspension assemblies 85, 125 may include a manual pin, which is placed to maintain the road height and non-vertical movement.

Figure 6:
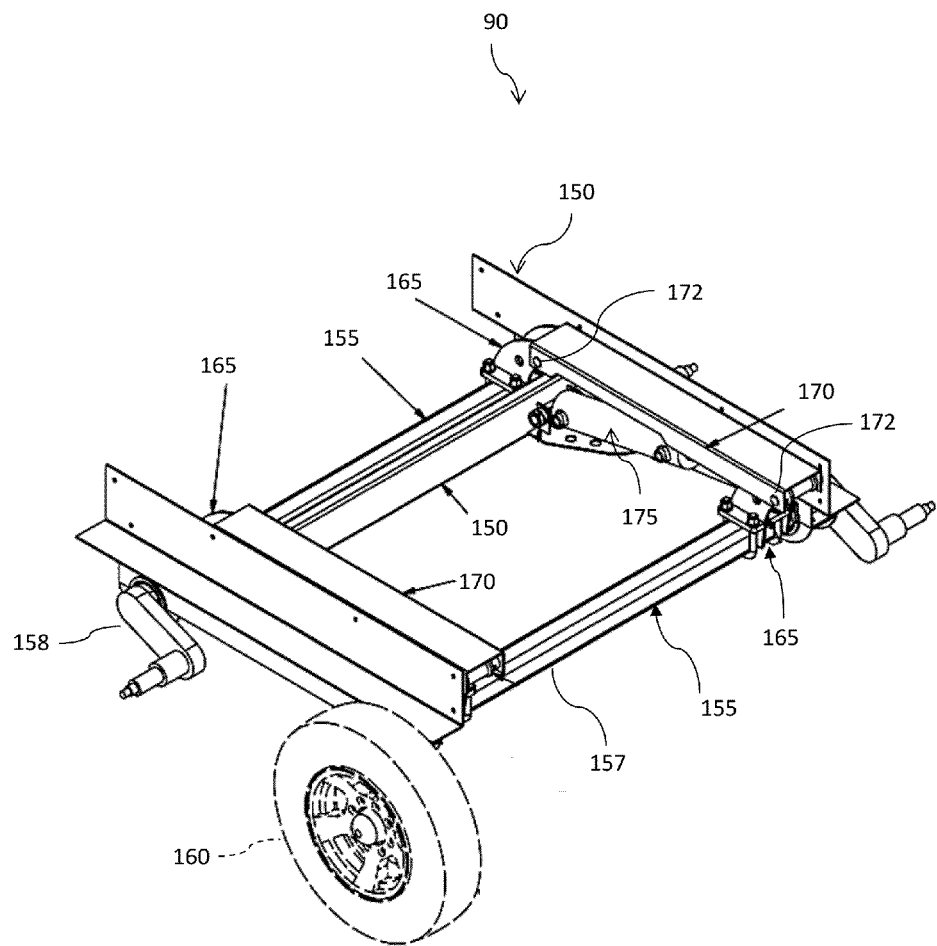
FIG. 6 is an assembled perspective view of a rear suspension assembly, according to some embodiments of the disclosure.
Figure 7:
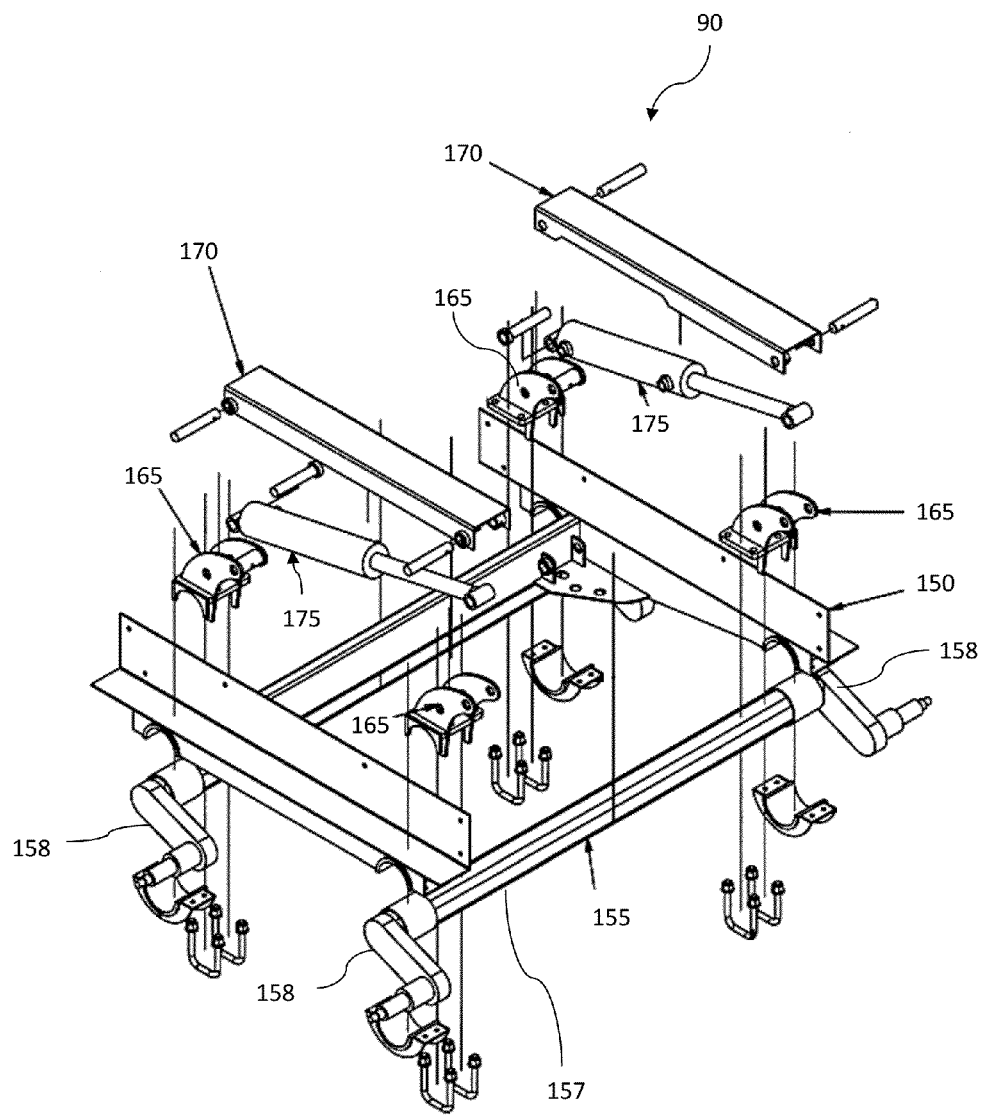
FIG. 7 is an exploded perspective view of the rear suspension assembly of FIG. 6, according to some embodiments of the disclosure.

FIGS. 6 and 7 are perspective views of a rear suspension assembly 90, according to some embodiments of the disclosure. FIG. 6 is an assembled perspective view of rear suspension assembly 90. FIG. 7 is an exploded perspective view of rear suspension assembly 90. In the illustrated embodiment, the rear suspension assembly 90 includes a rear suspension frame 150, which is adapted to be securely attached to the body 45. For example, the rear suspension frame 150 may be bolted onto the body 45. A plurality of torsion axles 155 is rotatably attached to the rear suspension frame 150. As shown, the plurality of torsion axles 155 is a pair of torsion axles, or tandem axles. For example, each torsion axle 155 is secured in a bushing on the suspension frame 150. One torsion axle is positioned rearward of the other torsion axle in the pair of torsion axles 155. The torsion axles 155 each include a torsion bar 157 extending laterally and torsion arms 158 extending perpendicularly from each end of the torsion bar. In the illustrated embodiment, the torsion bar 157 is in a straight configuration. In other embodiments (not shown), the torsion bar 157 is in a "V"-shaped configuration allowing the boat 25 to sit even lower in the adaptable boat trailer 20.

In some embodiments, the torsion axles 155 may have extended torsion arms, which derates the torsion axle weight limit, extends the range of the arcing travel of the wheels 160, and provides a gentler ride for boat 25 when being transported, especially over bumps in the road. In further embodiments, the elasticity of the torsion axles 155 is modified to enhance the gentle ride for the boat 25. For example, in some embodiments, the maximum load rating of each torsion axle 155 is in a range from greater than or equal to about 4,500 to and less than or equal to about 9,000 pounds with two torsion axles total. In some preferred embodiments with two torsion axles, the maximum load rating of each torsion axle 155 is 6,700 pounds. In various embodiments, the torsion axles 155 are modified from an original maximum load rating in a range from 6000 to 12,000 pounds. In some embodiments, the strength of the torsion arms 158 is enhanced to support the maximum load rating. The maximum load rating is selected in response to the weight of the boat 25. Further embodiments of the disclosure include three torsion axles 155, for example, used in combination and similar principles are used to select or modify the maximum load rating of these torsion axles.

A pair of wheels 160 is rotatably attached to each of the torsion axles 155, for example attached to the ends of the torsion arms 158, which enables the adaptable boat trailer 20 to move (i.e., by rolling) over a surface. As shown, the wheels 160 include tires. A pair of lever arms 165 is attached to each torsion axle 155, for example attached to the torsion bar 157, and extends perpendicularly to the torsion bar 157. The lever arms 165 are not rotatable relative to the torsion bar 157 such that moving a lever arm will rotate a torsion bar 157. A pair of beams 170 each extend longitudinally and are rotatably attached to two lever arms at a joint 172 such that the torsion axles 155 rotate together. The pair of beams 170 are also laterally offset from the center of the adaptable boat trailer 20. In the configuration shown, the pair of beams 170 may raise and lower while avoiding the hull of the boat 25, which has a lowest point near its lateral center.

The rear suspension assembly 90 is configured for raising and lowering the rear end 40 of the trailer frame 30 (shown elsewhere) by extending or contracting hydraulic cylinders 175. In other words, the wheels 160 are retractable or extendable. A pair of hydraulic cylinders 175 are each secured on one end to one of the lever arms 165, for example at the joint 172 where the pair of beams 170 are attached, and secured on the other end to the rear suspension frame 150 such that the torsion axles 155 rotate upon extending or contracting the hydraulic cylinders. The pair of hydraulic cylinders 175 are oriented longitudinally in a parallel and disposed laterally offset from each other. Extension and contraction of the hydraulic cylinders 175 rotates both torsion axles 155, which raises and lowers, respectively, the pairs of wheels 160.

The hydraulic cylinders 175 each have a maximum load rating. In some embodiments, the maximum load rating is at least twice the maximum load rating of each torsion axle. For example, the maximum load rating of each hydraulic cylinder 175 is greater than or equal to about 9,000 pounds when each torsion axle 155 has a maximum load rating of 4,500 pounds. In some preferred embodiments, each hydraulic cylinder 175 has a maximum load rating of 20,000 pounds. In further embodiments, the rear suspension assembly 90 includes a pair of isolated circuits (not shown) to control and power each hydraulic cylinder. The isolated circuits may comprise hydraulic, electrical, and/or electronic components. In this case, each hydraulic cylinder is coupled to a hydraulic cylinder independently. When a circuit connected to one hydraulic cylinder fails, the other circuit may remain operable to power the other hydraulic cylinder. Because each hydraulic cylinder 175 has a maximum load rating twice that of each torsion axle, one hydraulic cylinder to can safely raise and lower the rear end 40. The adaptable boat trailer 20 may have a maximum load rating in response to the maximum load ratings of the torsion axles 155, the maximum load ratings of the hydraulic cylinders 175, and the wheels 160 including the tires.

Figure 8A:
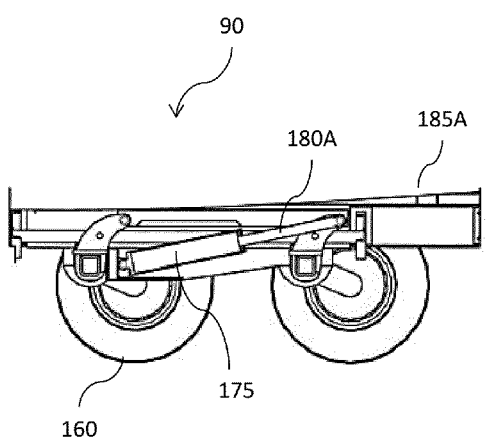
FIGS. 8A-B are elevated side views along cross-section B-B-B of the rear suspension assembly of FIG. 6 with the hydraulic cylinders in various positions, according to some embodiments of the disclosure.
Figure 8B:
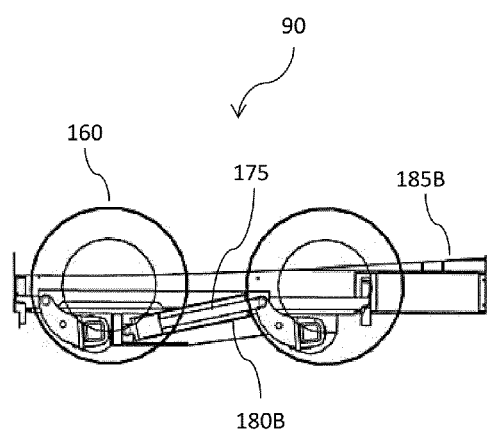

FIGS. 8A-B are elevated side views of the rear suspension assembly 90 along cross-section B-B-B (shown in FIG. 1) with the hydraulic cylinders 175 in various positions 180A-B, according to some embodiments of the disclosure. Extended position 180A corresponds to a raised position 185A (e.g. road clearance position) of the rear end 40 (shown elsewhere), which may further correspond to a road clearance height. Contracted position 180B corresponds to a lowered position 185B of the rear end 40 below the road clearance position 185A, such as a launch or recovery position. In some embodiments, the lowered position 185B is about 15 inches below the raised position 185A at a road clearance height of about 14 inches, resulting in the wheels 160 being above a low portion of the trailer frame 30.

Figure 9:
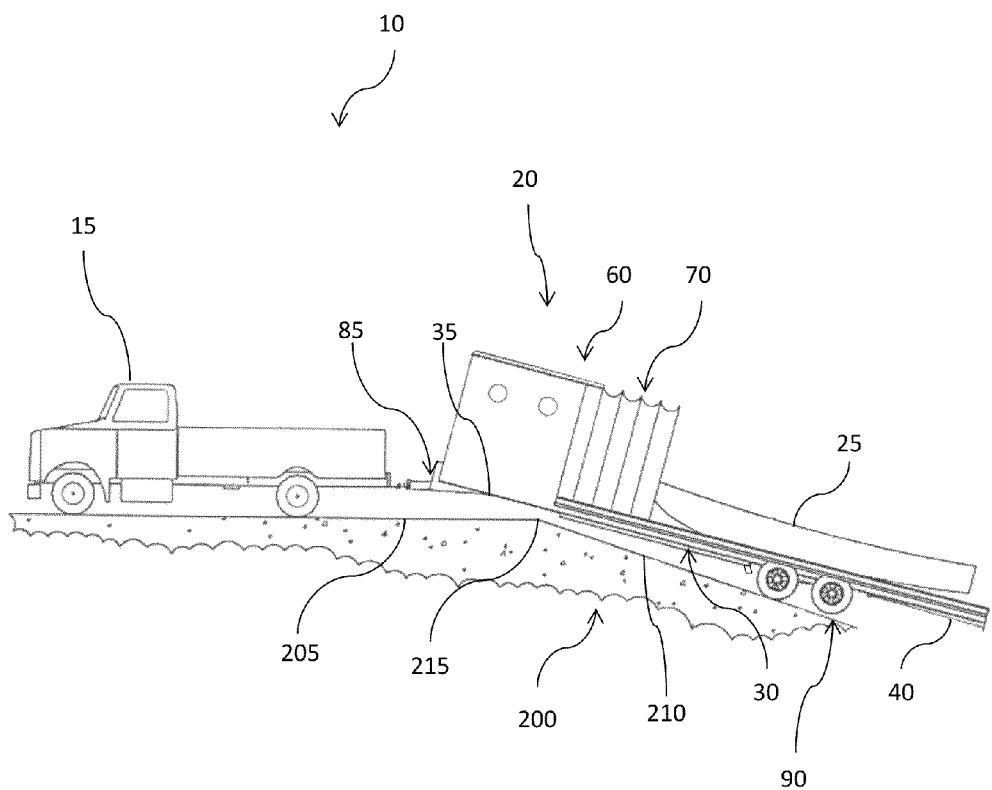
FIG. 9 is an elevated side view of the boat transportation system of FIG. 1 being backed onto a ramp, according to some embodiments of the disclosure.
Figure 10:
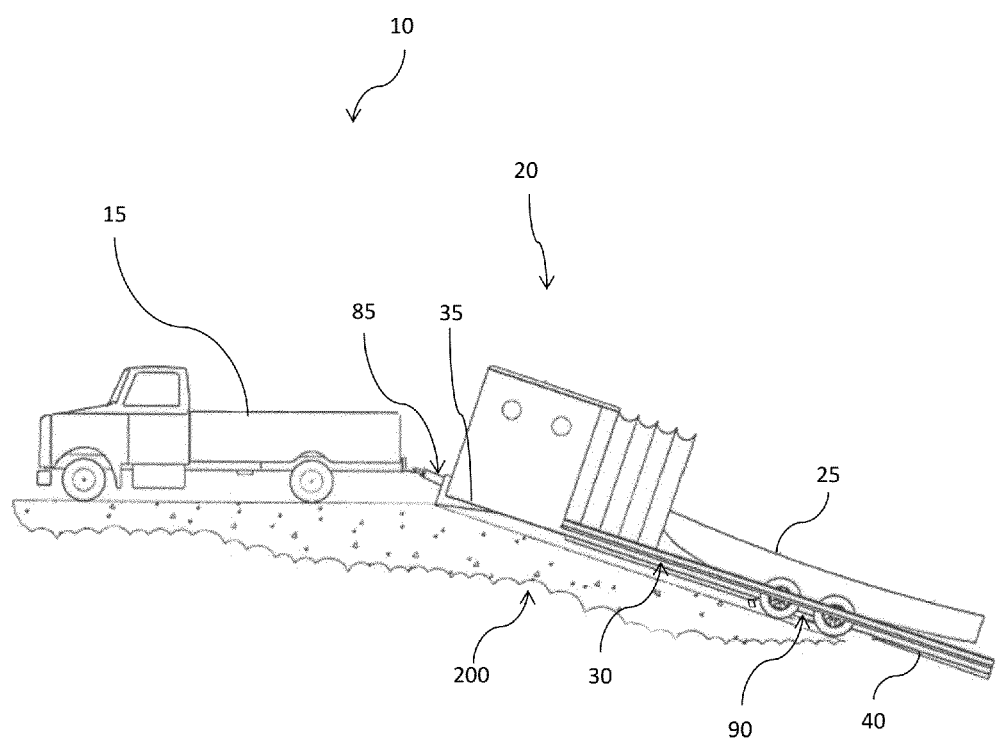
FIG. 10 is an elevated side view of the boat transportation system of FIG. 1 being backed into a body of water from a ramp, according to some embodiments of the disclosure.
Figure 11:
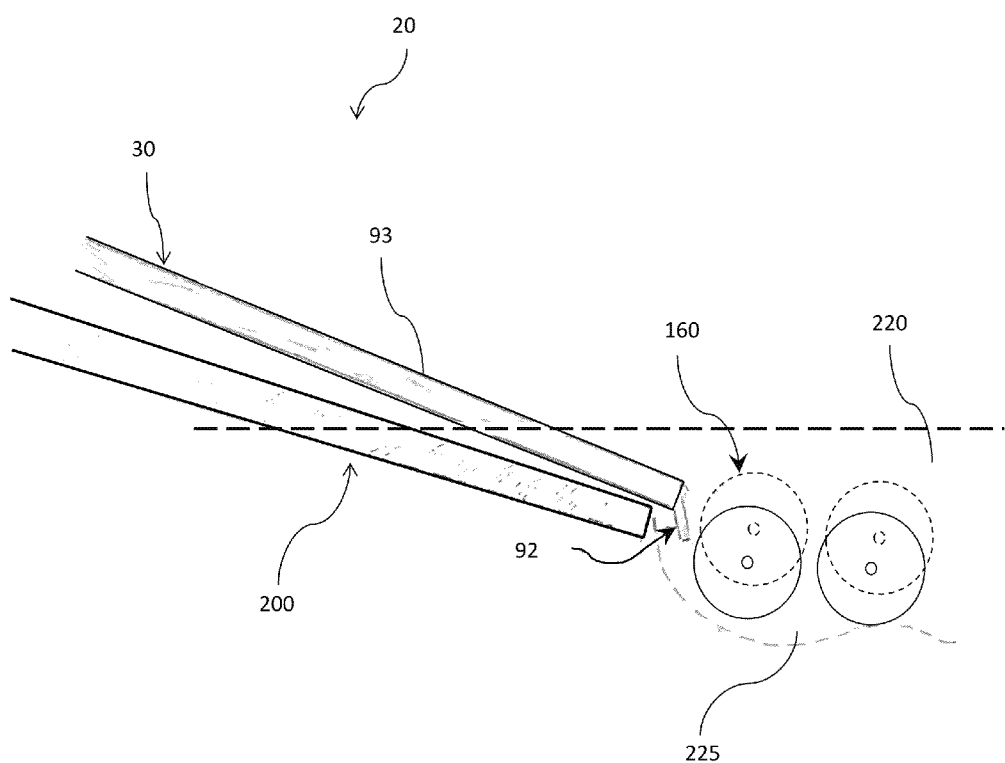
FIG. 11 is a detailed schematic illustration of the adaptable boat trailer of FIG. 1 in a washout during recovery, according to some embodiments of the disclosure.
Figure 12:
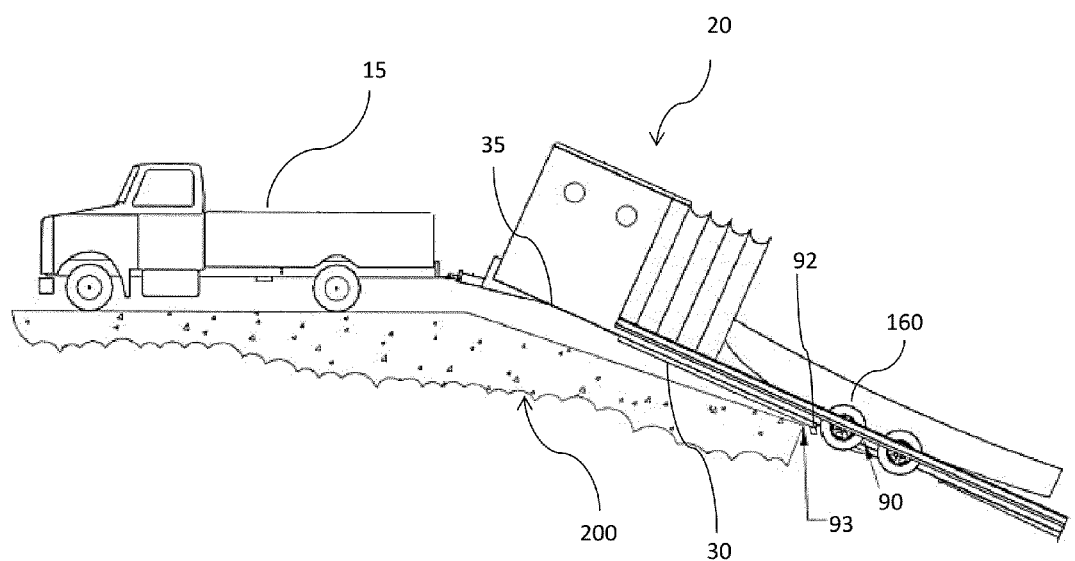
FIG. 12 is an elevated side view of the boat transportation system of FIG. 1 adapted to rescue wheels from the washout during recovery, according to some embodiments of the disclosure.

In FIGS. 9-12, launching and recovering a boat 25 from the adaptable boat trailer 20 is described in detail. FIG. 9 is an elevated side view of boat transportation system 10 being backed onto a ramp 200. FIG. 10 is an elevated side view of the boat transportation system 10 being backed into a body of water 220 from ramp 200. FIG. 11 is a detailed schematic illustration of the adaptable boat trailer 20 in a washout 225 during recovery. FIG. 12 is an elevated side view of the boat transportation system 10 adapted to rescue wheels 160 from the washout 225 during recovery.

The boat transportation system 10 is shown including vehicle 15 and adaptable boat trailer 20. As shown, the adaptable boat trailer 20 includes a cover assembly 60 having a retractable tarp system 70 that has been retracted to uncover a rear section of the adaptable boat trailer 20 and the boat 25. The boat transportation system 10 is backed onto a ramp 200 extending toward a body of water 220. Some ramps 200 extend into a body of water 220, as illustrated in FIG. 11. Ramp 200 includes a top section 205 having a shallow grade, a bottom section 210 having a steeper grade than the top section 205 and extending toward a body of water 220, and a transition 215 (a.k.a. hump) between the top section and bottom section. The top section 205 and bottom section 210 may be different surfaces, such as dirt, asphalt, wood, or concrete, as some examples. Some transitions 215 may include a severe angle.

During launch, the adaptable boat trailer 20 is backed onto the ramp 200, and the front end 35 is raised above a road clearance height to prevent the trailer frame 30, such as the body 45, or portion of the adaptable boat trailer 20 (i.e., other than the wheels 160) from contacting the transition 215, for example, with the front suspension assembly 85 in a raised position. Rear end 40 of the trailer frame 30 is in a raised position at a road clearance height, for example, with the rear suspension assembly 90 in a raised position. As the adaptable boat trailer 20 is backed down the ramp 200, the rear end 40 enters the body of water 220.

In FIG. 10, the rear end 40 of the trailer frame 30 is shown lowered below a road clearance height before the wheels 160 are backed off the ramp 200, for example, with the rear suspension assembly 90 in a lowered position. Front end 35 is shown lowered after clearing the transition 215, for example, with front suspension assembly 85 in an intermediate position. In other embodiments, the front end 35 is lowered below a road clearance height to facilitate a low-angle launch, for example, with the front suspension assembly 85 in a lowered position. The adaptable boat trailer 20 is backed down the ramp 200 sufficient to float the boat 25 in the body of water 220 before releasing the boat. In some cases, the rear end 40 is off the ramp 200 before launch is complete.

Turning now to FIG. 11 relating to rescue, the adaptable boat trailer 20 is backed at least partially into the body of water 220, after launching the boat 25 or before receiving the boat. After receiving the boat 25, for example, the adaptable boat trailer 20 is pulled up the ramp 200. Near the end of ramp 200, in the body of water 220, a washout 225 has formed. A washout 225 is a pit below the surface of the body of water 220, which is formed by engaging boat propellers during recovery of the boat onto a boat trailer, as known to those having skill in the art.

At times during launch or recovery, the wheels 160 can be caught in the washout 225 by the end of the ramp 200, which prevents the adaptable boat trailer 20 from being pulled farther up the ramp. The wheels 160 may be raised in an action similar to lowering the rear end 40 of the trailer frame 30, which allows the wheels to be lifted out of the washout 225. For example, the center point of the wheels 160 may be raised above the bottom of the trailer frame 30, in a manner described elsewhere in this disclosure for example, to allow the wheels to escape the washout 225 and begin rolling onto the ramp 200.

In the illustrated embodiment, the trailer frame 30 includes a rescue flange 92 and a skid rail 93 positioned forward of the wheels 160. The skid rail 93 may contact the ramp 200 in some embodiments. The rescue flange 92 has a geometry including a rescue height. The rescue flange 92 may decrease the distance the wheels 160 travel before escape from the washout 225 is enabled. For example, the center point of the wheels 160 may be retracted above the lowest point of the rescue flange 92 (i.e., the rescue height) to allow the wheels to escape the washout 225 and begin rolling onto the ramp 200. In some embodiments, the lowest point of the wheels 160 may be retracted above the lowest point of the rescue flange 92.

FIG. 12 shows the adaptable boat trailer 20 having the wheels 160 in the raised position with vehicle 15 pulling the adaptable boat trailer up the ramp after recovery. Similar to launch, the front end 35 is raised above a road clearance height to prevent the trailer frame 30 from contacting the transition 215. The rear suspension assembly 90 has wheels 160 in a raised position. The skid rail 93 contacts the ramp 200. Rescue flange 92 is positioned to lift the wheels 160 as the adaptable boat trailer 20 is pulled up the ramp 200.

Figure 13:
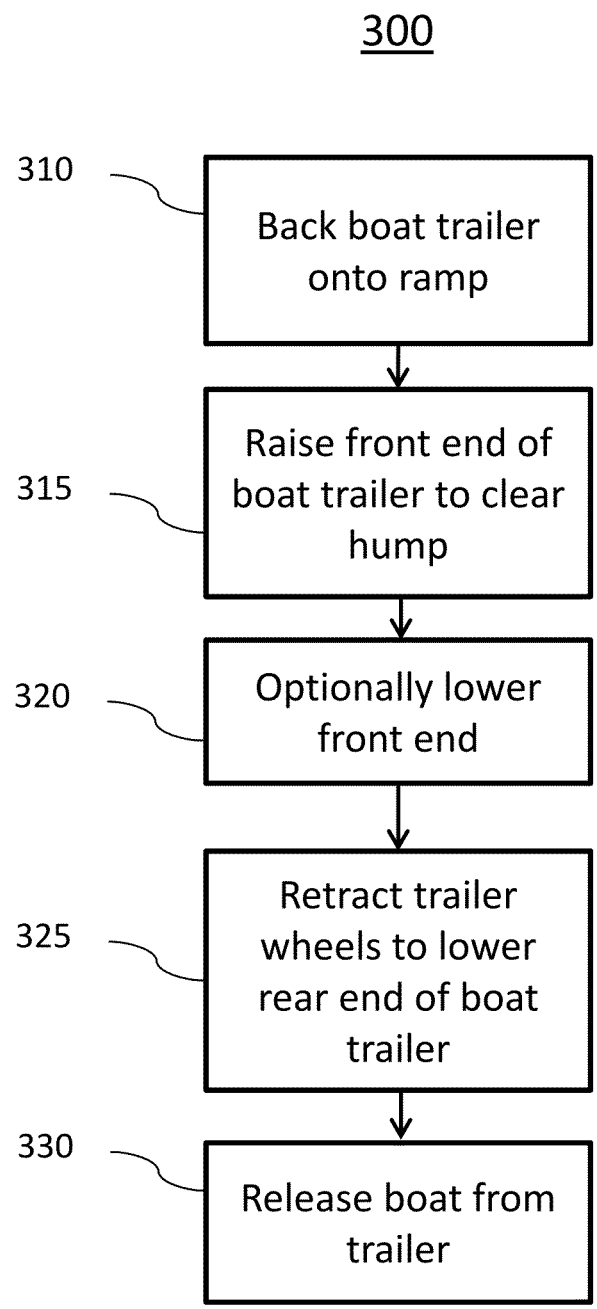
FIG. 13 is a schematic illustration of a method of launching a boat, according to some embodiments of the disclosure.

FIG. 13 is a schematic illustration of a method 300 of launching a boat, according to some embodiments of the disclosure. In step 310, the boat trailer is backed onto a ramp.

In step 315, a front end of the boat trailer, or a trailer frame of the boat trailer, is optionally raised to clear a hump in the ramp, in particular a severe drop in elevation, to prevent a portion of the boat trailer from contacting the ramp.

In step 320, the front end of the boat trailer is optionally lowered to provide a more horizontal position of the boat compared to the ramp, which may be steep. In particular, lowering the front end facilitates a low-angle launch for ease of launch entry due to the boat hull being more aligned to the surface of the water. This may be done as the boat trailer descends on the ramp, for example. In step 325, the boat trailer wheels are optionally retracted to lower a rear end of the boat trailer. This lowers the boat into the water.

In step 330, the boat is released from the trailer. In some embodiments, the boat is released after it submerges about 8 to 10 inches into the water, which allows the boat to free float.

Figure 14:
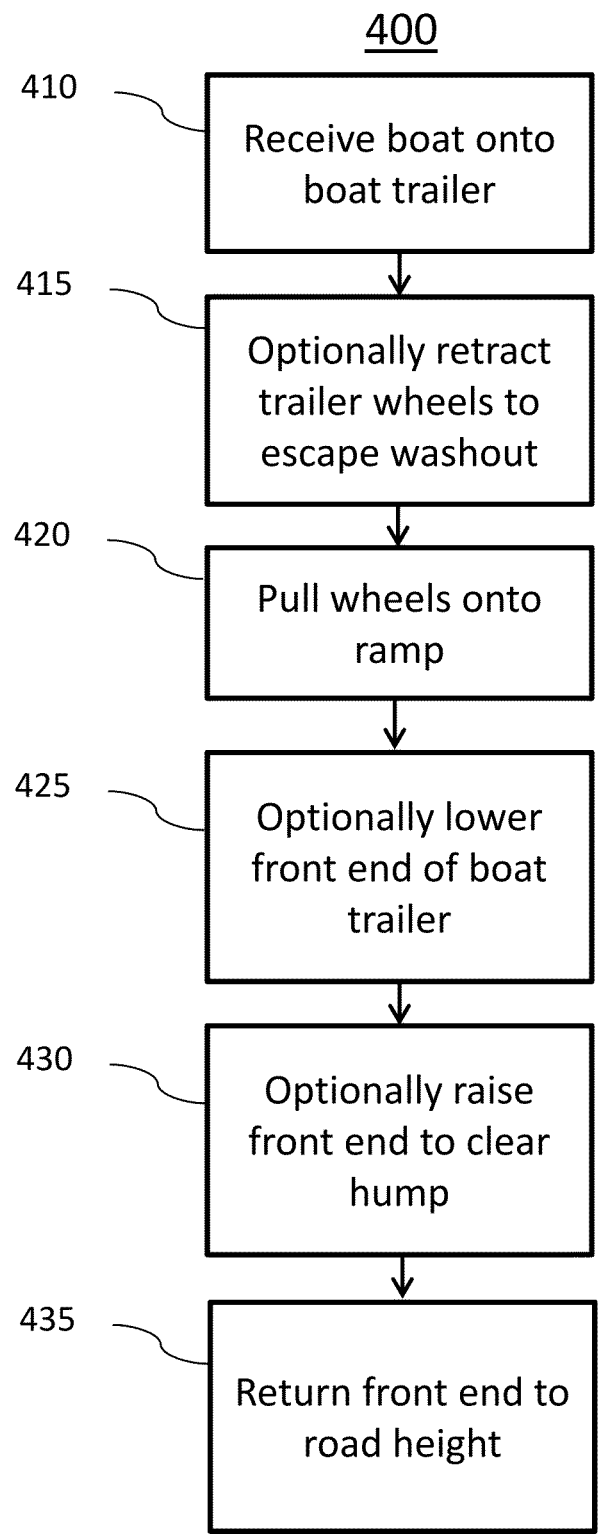
FIG. 14 is a schematic illustration of method of recovering a boat, according to some embodiments of the disclosure.

FIG. 14 is a schematic illustration of method 400 of recovering a boat, according to some embodiments of the disclosure. In step 410, a boat trailer receives a boat. The boat may be secured to the boat trailer, for example, by load straps on the trailer and a winch line.

In step 415, the trailer wheels are optionally retracted to escape a washout. In step 420, the wheels are pulled onto the ramp. When step 415 is performed, the wheels are extended before being pulled onto the ramp. A cover may be placed over the boat after the boat trailer is substantially removed from the water.

In step 425, the front end of the boat trailer is optionally lowered to provide a more horizontal position of the boat compared to the ramp, which may be steep. This allows the boat to proceed up the ramp at a more horizontal position, which is also a more natural position for the boat.

In step 430, the front end of the boat trailer, or trailer frame of the boat trailer, is optionally raised to clear a hump, which may be severe, to prevent a portion of the boat trailer from contacting the ramp.

In step 435, the wheels are returned to a normal road height. In other words, the boat trailer may be set at a level road height for travel along a road surface.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. In addition, the steps of methods, such as methods 300 and 400, may be performed in any order suitable for launching or recovering the boat in response to various conditions at the time of launch or recovery. Accordingly, the scope of the present invention is intended to embrace all such alternatives, modifications, and variations as fall within the scope of the claims, together with all equivalents thereof.

We claim:

1. An adaptable boat trailer, comprising:
a trailer frame including a front end, a rear end, a body between the front end and the rear end, a plurality of support bunks on the body configured to support a boat, the rear end including a propeller shield;
a cover assembly attached to the trailer frame for selectively covering the boat;
a front suspension assembly attached to the trailer frame front end and configured for independently raising and lowering the front end of the adaptable boat trailer, the front suspension assembly including a coupler for removably securing the adaptable boat trailer to a hitch on the vehicle, at least one hydraulic cylinder adapted to contract and extend, and a suspension arm attached to the coupler and the at least one hydraulic cylinder adapted to move in response to the contracting and extending of the at least one hydraulic cylinder; and
a rear suspension assembly attached to the trailer frame and configured for raising and lowering the rear end of the trailer frame, the rear suspension assembly including a rear suspension frame attached the trailer frame, a plurality of torsion axles rotatably attached to the rear suspension frame, a pair of wheels attached to each of the plurality of torsion axles to enable the adaptable boat trailer to move over a surface, a pair of lever arms extending perpendicularly from each torsion axle, a pair of beams extending longitudinally in parallel each rotatably attached to two lever arms such that the torsion axles rotate together, and at least one rear hydraulic cylinder secured on a first end to one of the lever arms of a torsion axle and secured on a second end to the rear suspension frame such that the torsion axles rotate in response to contracting and extending the at least one rear hydraulic cylinder.

2. The adaptable boat trailer of claim 1, wherein the rear suspension assembly is configured for raising and lowering the trailer frame between a raised position and a lowered position, the raised position at a road clearance height.

3. The adaptable boat trailer of claim 2, wherein in the lowered position, the trailer frame is lowered such that a low point of the trailer frame is below a center point of the wheels.

4. The adaptable boat trailer of claim 1, wherein the adaptable boat trailer has a maximum load rating based on a maximum load rating of the torsion axles, the maximum load rating of the at least one rear hydraulic cylinder, and the maximum load rating of the wheels having tires, wherein the at least one rear hydraulic cylinder has a maximum load rating at least twice the maximum load rating of each torsion axle or more.

5. The adaptable boat trailer of claim 4, wherein the maximum load rating of each torsion axle is greater than or equal to about 4,500 pounds and less than or equal to about 9,000 pounds.

6. The adaptable boat trailer of claim 5, wherein the maximum load rating of the at least one rear hydraulic cylinder is greater than or equal to about 9,000 pounds.

7. The adaptable boat trailer of claim 4, wherein the at least one rear hydraulic cylinder includes a pair of hydraulic cylinders, the rear suspension assembly further including a pair of isolated circuits, a first circuit coupled to a first of the pair of rear hydraulic cylinders, a second circuit coupled to a second of the pair of rear hydraulic cylinders, wherein when one circuit fails, the other circuit remains operable to power at least one rear hydraulic cylinder.

8. The adaptable boat trailer of claim 1, wherein the front suspension assembly is configured for raising the front end above a road clearance height and for lowering the front end below the road clearance height.

9. The adaptable boat trailer of claim 1, wherein the coupler is one of a ball trailer hitch-type coupler, a pintle-type coupler, and a gooseneck-type coupler.

10. The adaptable boat trailer of claim 1, wherein the cover assembly includes a retractable tarp system on a rear section of the trailer frame and a fixed cabin on a front section of the trailer frame, wherein the adaptable boat trailer is configured to fully encapsulate the boat to protect the boat from the environment.

11. The adaptable boat trailer of claim 10, wherein the retractable tarp system includes a slidable cover and a rear flap attached to a slidable cover, the slidable cover configured for retracting into an accordion-like shape to uncover a rear section of the adaptable boat trailer and configured for extending to cover the rear section, the rear flap configured for rolling up to uncover the rear of the retractable tarp system.

12. The adaptable boat trailer of claim 1, wherein the trailer frame is sized and shaped to support a pleasure boat 18 to 34 feet in length.

13. The adaptable boat trailer of claim 1, further including a rescue flange attached to the trailer body and positioned forward of the wheels, the rescue flange extending at an angle downward and backward from the trailer frame, the rescue flange configured to engage a ramp during recovery to lift the rear end of the trailer frame as the adaptable boat trailer is being pulled out of a body of water.

\* \* \* \* \*